United States Patent
Himeno et al.

(10) Patent No.: US 7,744,359 B2
(45) Date of Patent: Jun. 29, 2010

(54) TIRE VULCANIZING APPARATUS

(75) Inventors: Shinya Himeno, Kobe (JP); Youjirou Miki, Kobe (JP); Tadayoshi Yamaguchi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/300,319

(22) PCT Filed: May 30, 2007

(86) PCT No.: PCT/JP2007/061007

§ 371 (c)(1),
(2), (4) Date: Nov. 10, 2008

(87) PCT Pub. No.: WO2007/139160

PCT Pub. Date: Dec. 6, 2007

(65) Prior Publication Data
US 2009/0123585 A1    May 14, 2009

(30) Foreign Application Priority Data
May 31, 2006  (JP) ............................. 2006-152201

(51) Int. Cl.
    B29C 35/02    (2006.01)
(52) U.S. Cl. ....................... 425/38; 425/58.1
(58) Field of Classification Search ............. 425/38, 425/58.1
    See application file for complete search history.

(56) References Cited

U.S. PATENT DOCUMENTS

| | | | |
|---|---|---|---|
| 4,585,405 A | * | 4/1986 | Capecchi ................... 425/38 |
| 4,773,810 A | * | 9/1988 | Nishimura et al. ..... 414/331.11 |
| 5,741,528 A | * | 4/1998 | Amano et al. ................. 425/38 |
| 5,746,964 A | | 5/1998 | Ureshino et al. |
| 5,928,675 A | * | 7/1999 | Irie ........................... 425/38 |
| 6,554,597 B1 | | 4/2003 | Ichimaru |

(Continued)

FOREIGN PATENT DOCUMENTS

JP    3-150111 A    6/1991

(Continued)

Primary Examiner—James Mackey
(74) Attorney, Agent, or Firm—Birch, Stewart, Kolasch & Birch, LLP

(57) ABSTRACT

A tire vulcanizing apparatus 1 has a carrying-in position P1 into which a green tire TA is carried in from an original position P0, a vulcanizing position P2 at which the green tire TA is vulcanized, and a pressure cooling position P3 at which the vulcanized tire TA is pressure-cooled. The apparatus includes a traveling carriage 6 capable of reciprocating backward and forward, a vulcanization mold 4 having an upper mold 2 capable of moving up and down at the vulcanizing position P2 and a lower mold 3 disposed on the traveling carriage 6 and moving between the vulcanizing position P2 and the carrying-in position P1, a pressure cooling device 7 for pressure-cooling a vulcanized tire TB at the pressure cooling position P3, a tire receiving and mounting device 8 which is attached to the traveling carriage 6 and which receives at the vulcanizing position P2 the vulcanized tire TB from the upper mold 2 and mounts it on the pressure cooling device 7 at the pressure cooling position P3, and a green tire transfer device 9 for gripping and transferring the green tire TA to the lower mold 3 at the carrying-in position P1.

9 Claims, 11 Drawing Sheets

U.S. PATENT DOCUMENTS

| | | | |
|---|---|---|---|
| 6,610,238 B1 * | 8/2003 | Steidl et al. | 425/38 |
| 7,217,111 B2 * | 5/2007 | Ichimaru | 425/38 |
| 2003/0086993 A1 | 5/2003 | Ichimaru | |

FOREIGN PATENT DOCUMENTS

| | | |
|---|---|---|
| JP | 7-117055 A | 5/1995 |
| JP | 11-262921 A | 9/1999 |
| JP | 2000-158447 A | 6/2000 |
| JP | 2004-122407 A | 4/2004 |

* cited by examiner

TIRE VULCANIZING APPARATUS

TECHNICAL FIELD

The present invention relates to a tire vulcanizing apparatus capable of continuously and efficiently conducting carrying-in of green tires, vulcanization and pressure cooling, thereby enhancing the quality and uniformity of vulcanized tires.

BACKGROUND ART

As an apparatus for continuously vulcanizing and forming green tires in a tire vulcanization step is known one disclosed in Patent Literature 1: JP-A-2004-122407.

This apparatus is provided with a vulcanization mold composed of an upper mold and a lower mold, and a traveling carriage for reciprocating the lower mold between a position of carrying-in a green tire and a position of vulcanizing the tire. A carrying-out device for carrying out a vulcanized tire is connected to the lower mold. When mounting a green tire on the lower mold at the green tire carrying-in position, a vulcanized tire is made to fall on the carrying-out device from the upper mold located at the tire vulcanizing position and is carried out.

DISCLOSURE OF THE INVENTION

Problem to be Solved by the Invention

In recent years, however, it is desired to conduct, in the tire vulcanization step, a pressure cooling (so-called post-cure inflation) wherein a high temperature tire taken out from the vulcanization mold just after the vulcanization is charged with an inner pressure to expand the tire and is spontaneously cooled with stabilizing its shape by the expansion of the tire, thereby enhancing the uniformity of tire. Therefore, it is required that the vulcanized tire taken out of the vulcanization mold is conveyed to a pressure cooling device and mounted again. However, when the vulcanized tire which has been once detached from the vulcanization mold is mounted on the pressure cooling device, misalignment of the centers of the vulcanized tire and the pressure cooling device is easy to occur, so sufficient enhancement of the tire uniformity is not achieved. There also arises a problem that installation space increases since a device for conveying the tire to the pressure cooling device is needed.

Accordingly, it is an object of the present invention to provide a tire vulcanizing apparatus which is capable of continuously and efficiently performing the carrying-in of green tires, the vulcanization and the pressure cooling, while suppressing the off-center arrangement of the tires to thereby achieve formation of vulcanized tires with high accuracy and high efficiency, and which is also capable of achieving reduction of the installation space.

Means to Solve the Invention

The present invention provides a tire vulcanizing apparatus wherein a green tire carried-in is vulcanized using a vulcanization mold composed of upper and lower molds and the vulcanized tire is taken out after pressure cooling, and which is characterized in that:

the apparatus has a carrying-in position into which a green tire is conveyed from an original position, a vulcanizing position at which the green tire is vulcanized, and a pressure cooling position at which the vulcanized tire is pressure-cooled, and the apparatus includes a frame having rails;

a traveling carriage capable of reciprocating on the rails from the carrying-in position side toward the pressure cooling position side;

a vulcanization mold having an upper mold capable of moving up and down at the vulcanizing position, and a lower mold which is mounted on the traveling carriage and moves between the vulcanizing position and the carrying-in position;

a pressure cooling device disposed at the pressure cooling position and performing pressure cooling of the vulcanized tire with holding it;

a tire receiving and mounting device which is attached to the traveling carriage, and which receives at the vulcanizing position the vulcanized tire held by the upper mold, conveys it to the pressure cooling position and mounts it on the pressure cooling device; and a green tire transfer device having a grip assembly capable of gripping a green tire which has been conveyed to the original position and capable of moving up and down, the transfer device transferring the green tire to the lower mold by movement of the grip assembly to the carrying-in position followed by downward movement of the grip assembly, wherein the traveling carriage, the vulcanization mold, the pressure cooling device, the tire receiving and mounting device and the green tire transfer device are mounted on the frame.

Effects of the Invention

Since the present invention is constituted as mentioned above, it is possible to continuously conduct the carrying-in and vulcanization of green tires and the pressure cooling with suppressing possible off-center arrangement of the green tires and, therefore, vulcanized tires can be formed with high accuracy and high efficiency. The present invention also can make great contribution to reduction of installation space.

EXPLANATION OF SYMBOLS

Figure 1:
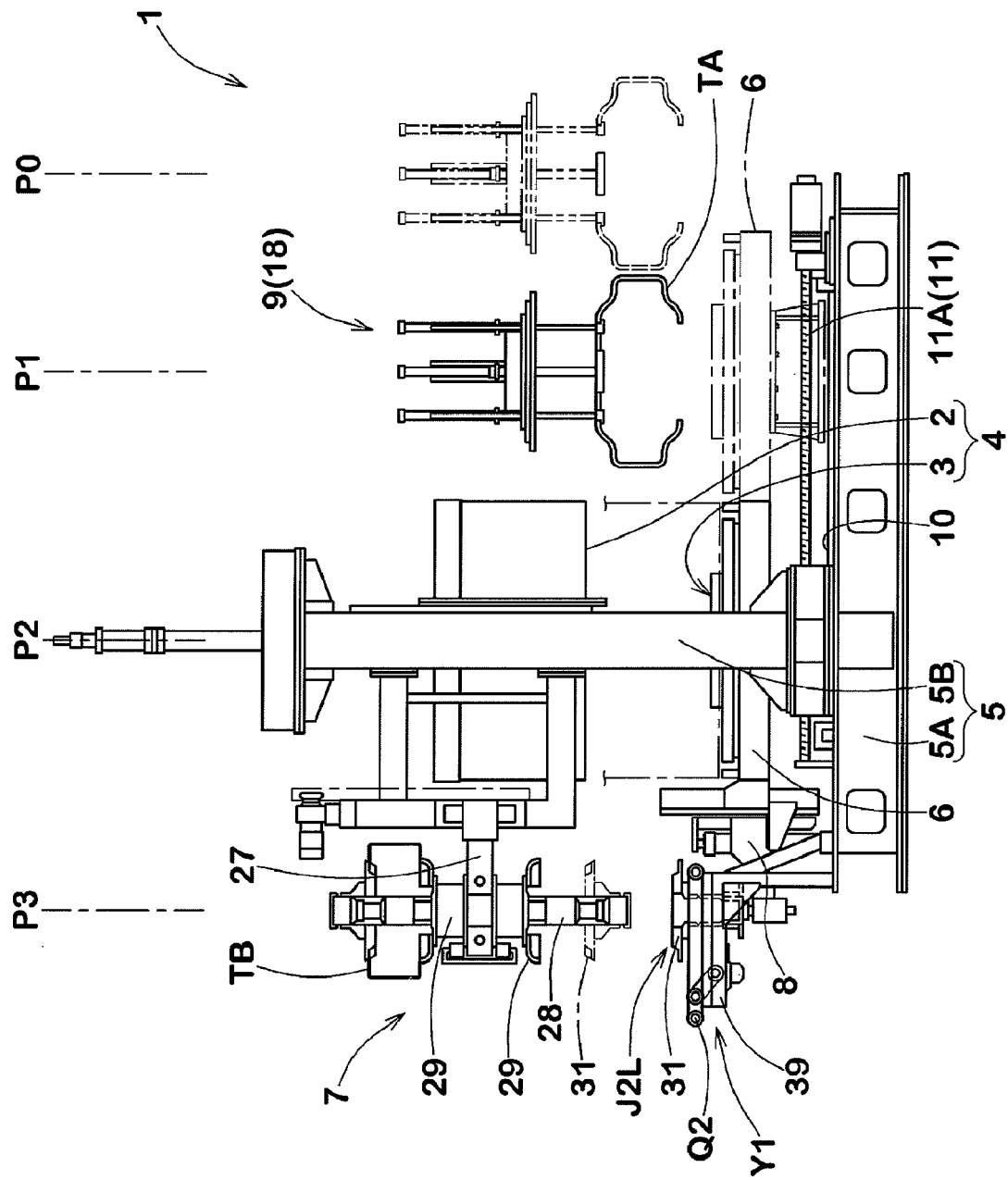
FIG. 1 is a front view of a tire vulcanizing apparatus illustrating an embodiment of the present invention.

1. Tire vulcanizing apparatus
2. Upper mold
3. Lower mold
4. Vulcanization mold
5. Frame
6. Traveling carriage
7. Pressure cooling device
8. Tire receiving and mounting device
9. Green tire transfer device
10. Rails
18. Grip assembly
19. Arm
25. Receiver
31. Lower rim
39. Carrying-out device
P0. Original position
P1. Carrying-in position
P2. Vulcanizing position
P3. Pressure cooling position
TA. Green tire
TB. Vulcanized tire

BEST MODE FOR CARRYING OUT THE INVENTION

An embodiment of the present invention will be explained with reference to the accompanying drawings.

Figure 2:
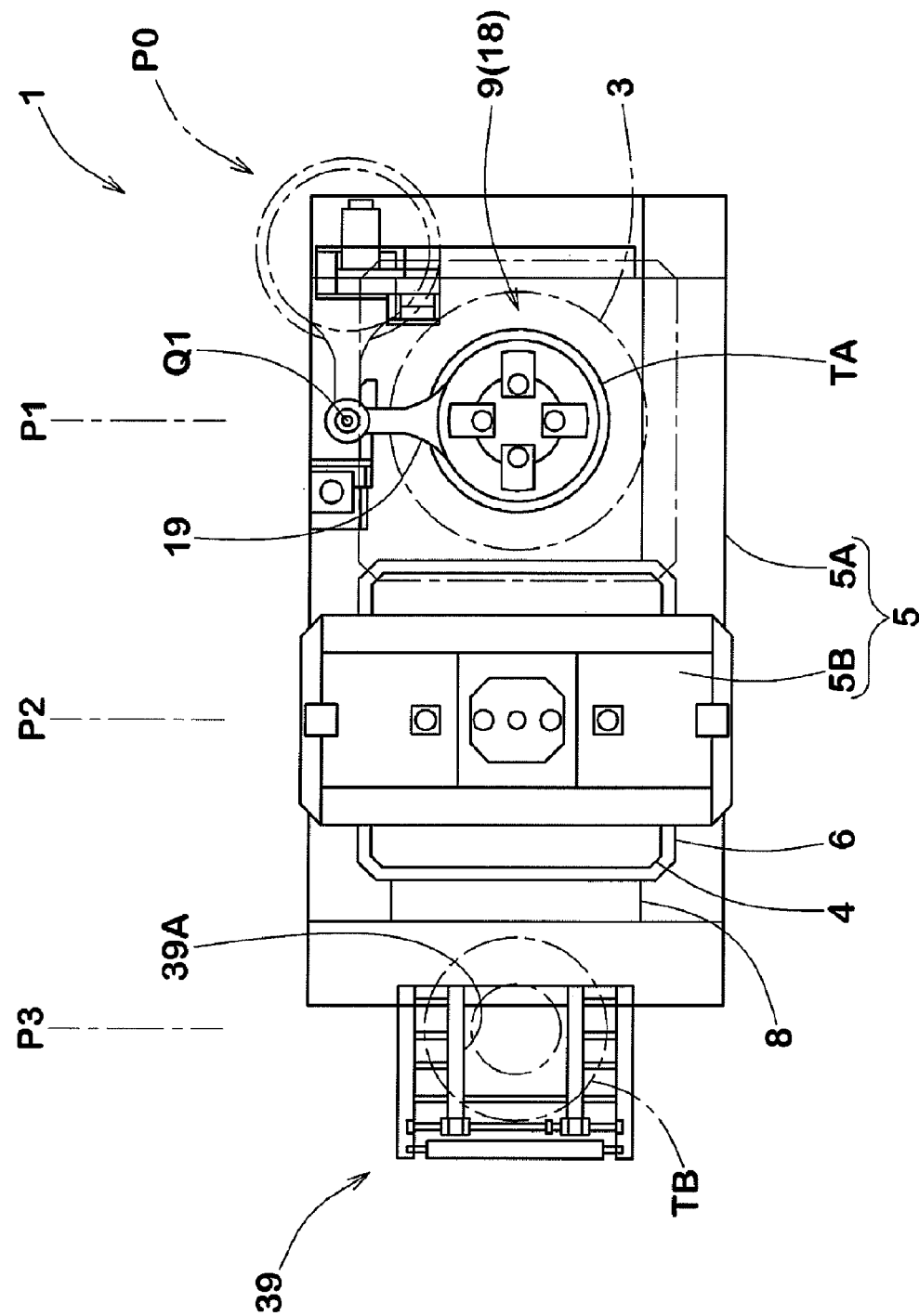
FIG. 2 is a plan view showing a part of the tire vulcanizing apparatus.

As shown in FIGS. 1 and 2, tire vulcanizing apparatus 1 in this embodiment is an apparatus for vulcanizing a carried-in green tire TA by using a vulcanization mold 4 composed of an upper mold 2 and a lower mold 3, followed by pressure cooling of the vulcanized tire TB. The tire vulcanizing apparatus 1 is provided with a carrying-in position P1 into which the green tire TA is carried in from an original position P0, a vulcanizing position P2 at which the green tire TA is vulcanized, and a pressure cooling position P3 at which the vulcanized tire TB is pressure-cooled. The carrying-in position P1, the vulcanizing position P2 and the pressure cooling position P3 are arranged on a line at even intervals.

The tire vulcanizing apparatus 1 is equipped with a traveling carriage 6, the vulcanization mold 4 mentioned above, a pressure cooling device 7, a tire receiving and mounting device 8 and a green tire transfer device 9, and they are attached to a frame 5.

The frame 5 is composed of a table-like base portion 5A provided with rails 10 extending backward and forward, and an upper frame portion 5B rising up from the base portion 5A. The traveling carriage 6 straddles the rails 10, 10, and can make a reciprocating movement on the rails 10 from the carrying-in position P1 side on the rear side of the apparatus toward the pressure cooling position P3 side on the front side of the apparatus. In this embodiment, the traveling carriage 6 is connected to a ball screw mechanism 11 having screw shafts 11A parallel to the rails, and can move back and forth by motor drive applied to the screw shafts 11A.

The vulcanization mold 4 is a mold of so-called split mold type, and it has an upper mold 2 which is supported by the upper frame portion 5B and can move up and down at the vulcanizing position P2, and a lower mold 3 which is disposed on the traveling carriage 6 and can move back and forth between the vulcanizing position P2 and the carrying-in position P1.

Figure 3:
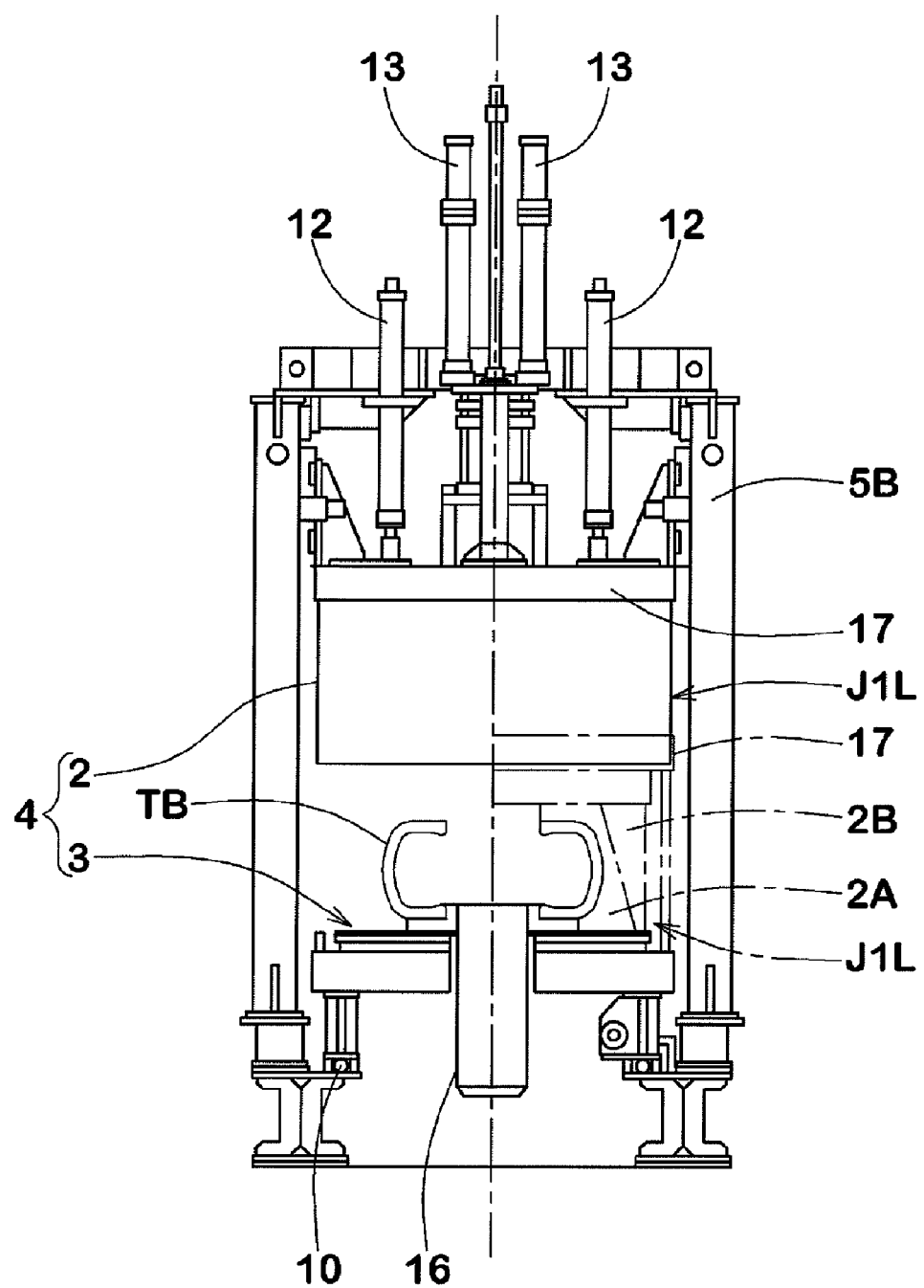
FIG. 3 is a side view of the tire vulcanizing apparatus as seen from a conveying direction.

As briefly shown in FIG. 3, the upper mold 2 has a known structure including an upper mold body 2A and an annular actuator 2B, wherein the upper mold body 2A comprises an upper side-mold corresponding to an upper side sidewall of a tire, an upper bead ring corresponding to an upper side bead, and a plurality of tread segments corresponding to a tread which are separable in the circumferential direction of tire and are expansible/contractible in diameter in the radial direction of tire, and the actuator 2B actuates the tread segments to expand and contract the diameter. The actuator 2B is attached to an upper base board portion 17 supported by the upper frame portion 5B through first cylinders 12 so as to be movable up and down. The upper mold body 2A is supported by the upper base board portion 17 through second cylinders 13 so as to be movable up and down. The upper mold 2 is in the closed state when it is at a descent position J1L, and is in the open state when it is at an elevated position J1U.

Figure 7:
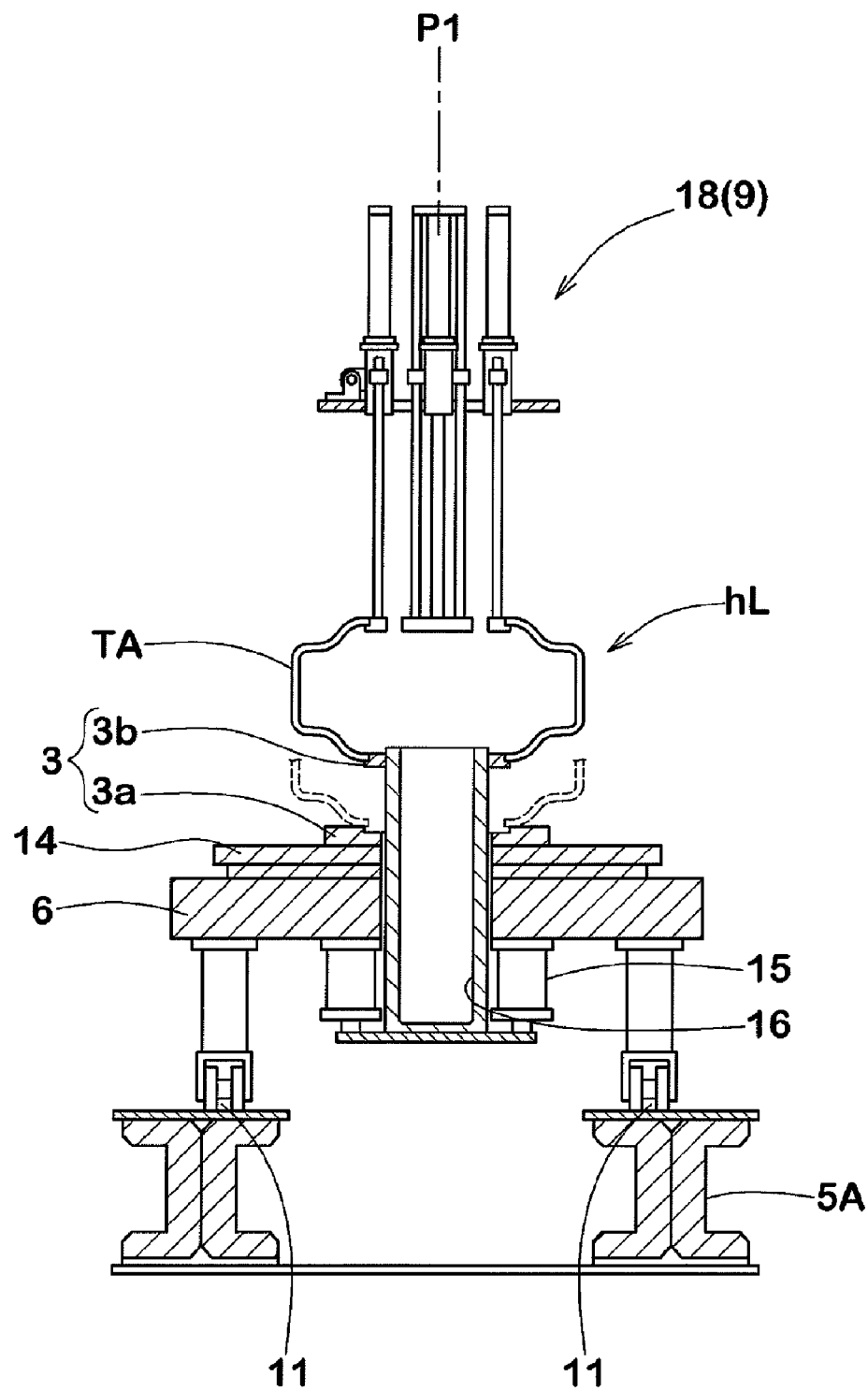
FIG. 7 is a cross sectional view illustrating transfer of a green tire to a lower mold by the green tire transfer device.

The lower mold 3 includes, as briefly shown in FIG. 7, a lower side-mold 3a corresponding to a lower side sidewall, and a lower bead ring 3b corresponding to a lower side bead. The lower side-mold 3a is fixed to a lower base board portion 14 fixed to the traveling carriage 6. The lower bead ring 3b is attached to an upper end portion of a cylindrical center mechanism 16 which is supported by the traveling carriage 6 (or the lower base board portion 14) through third cylinders 15 so as to be movable up and down. The center mechanism 16 can absorb and discharge a heating medium for vulcanization into or from a tire through, for example, a bladder.

The lower mold 3 can move between the vulcanizing position P2 and the carrying-in position P1 by backward and forward reciprocating movement of the traveling carriage 6.

Figure 4:
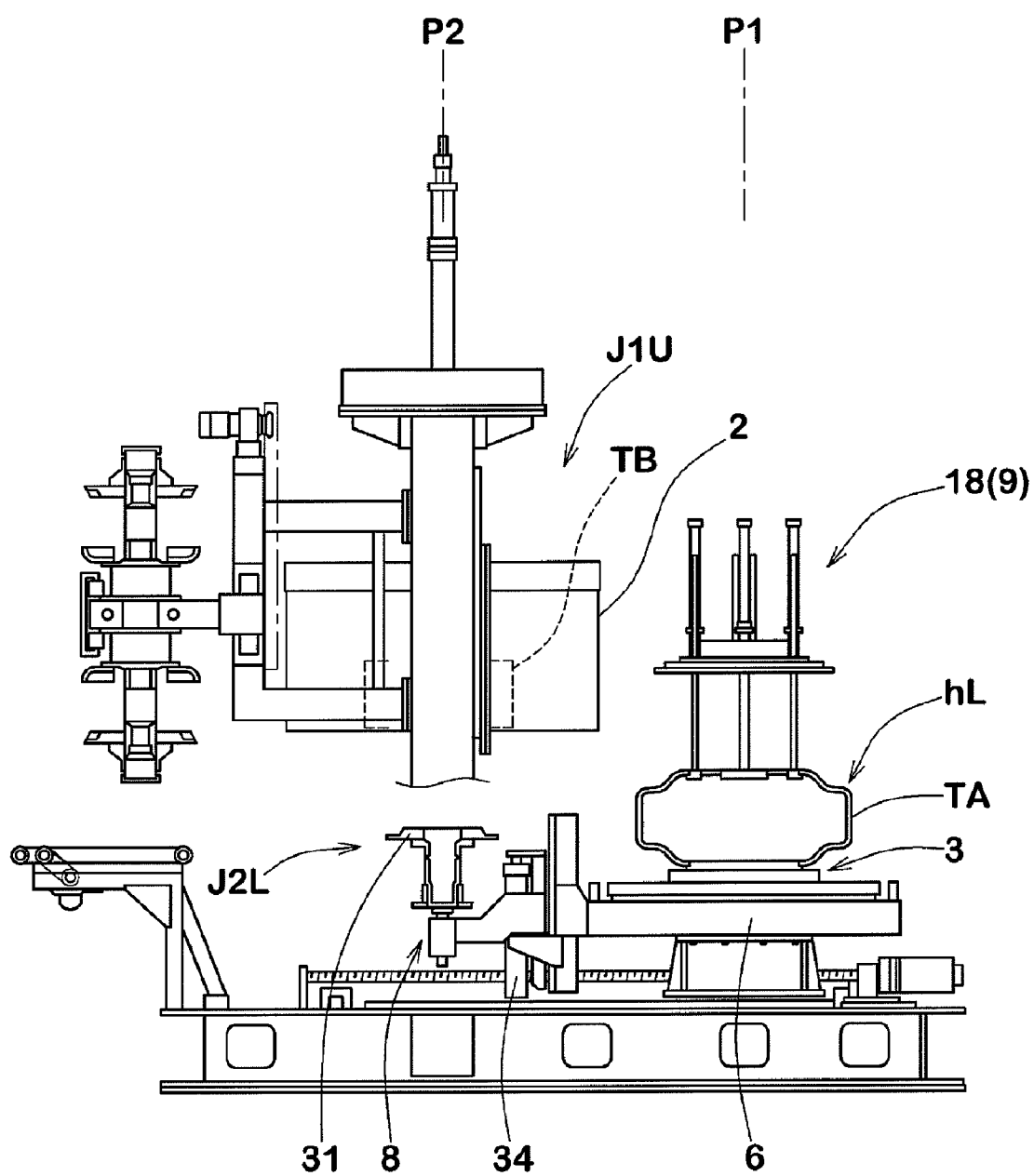
FIG. 4 is a front view showing the tire vulcanizing apparatus in the state that a traveling carriage is moved to an opposite side.

The green tire transfer device 9 is equipped with a grip assembly 18 capable of gripping a green tire TA conveyed to the original position P0 and capable of moving up and down. The grip assembly 18 moves from the original position P0 to the carrying-in position P1 and descends at the carrying-in position P1 and, as shown in FIG. 4, it transfers the gripped green tire TA to the lower mold 3.

Figure 5:
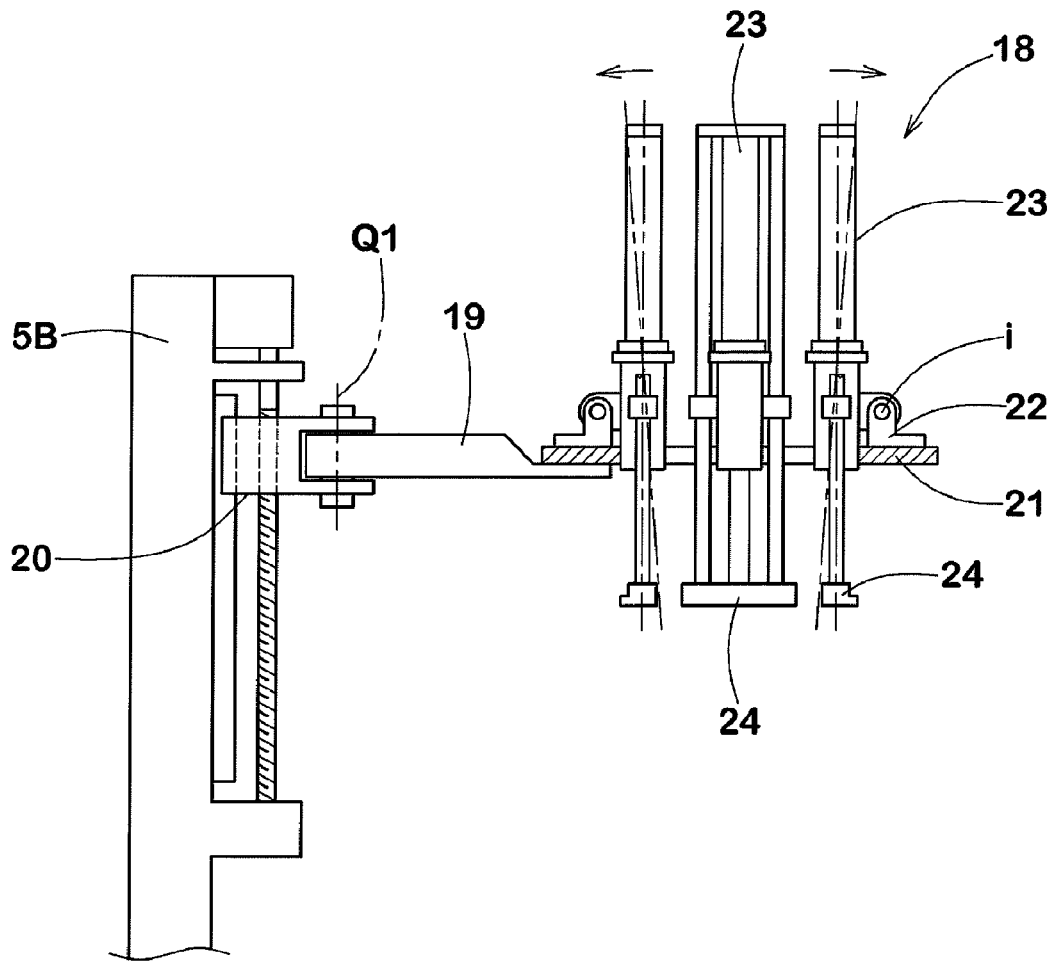
FIG. 5 is a cross sectional view illustrating a green tire transfer device.

In this embodiment, the green tire transfer device 9 has an arm 19 which is pivotally attached at its one end portion to the upper frame portion 5B, as shown in FIGS. 2 and 5, and which is pivotable about a pivot point Q1 in a horizontal plane, and the grip assembly 18 is attached to the other end portion of the arm 19. In this embodiment is shown a case where an elevating block 20 supported through a linear bearing or the like so as to be freely movable up and down is attached to the upper frame portion 5B, and the arm 19 is pivotally attached to the elevating block 20. The arm 19 may be directly pivotally attached to the upper frame portion 5B without using the elevating block 20.

Figure 6:
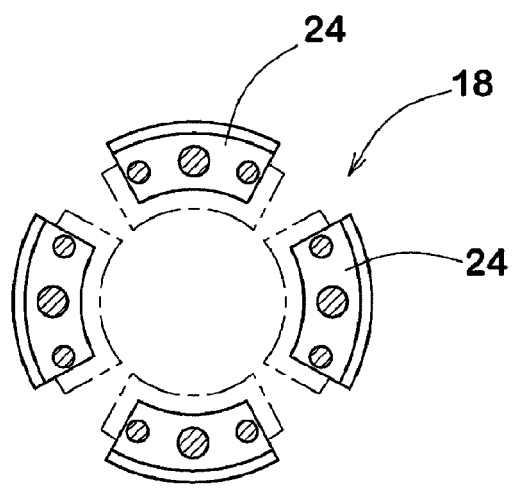
FIG. 6 is a plan view illustrating a grip assembly.

The grip assembly 18 is equipped with an annular frame 21 fixed to the above-mentioned other end of the arm 19, a plurality of cylinders 23 (in this embodiment, four cylinders) attached to the annular frame 21 and arranged at intervals on a circumferential line concentric with the annular frame 21, and gripping pieces 24 which are attached to lower ends of rods of the cylinders 23 and hold an upper side bead of the green tire TA in cooperation with each other. The cylinders 23 used in this embodiment are guide shaft-equipped cylinders, and are attached to the annular frame 21 through fittings 22 fixed to the annular frame 21 so as to be tiltable about a shaft center "i" from a standard state that the rods are perpendicular to the annular frame to an inwardly tilting state that the cylinders tilt in the direction that the lower ends of the rods move toward the center of the above-mentioned circumferential line. Thus, as shown in FIG. 6, the gripping pieces 24 can hold the upper side bead when the diameter expands in the standard state, and can release the upper side bead when the diameter contracts in the inwardly tilting state.

Therefore, the green tire transfer device 9 can transfer a green tire TA gripped at the original position P0 up to the carrying-in position P1 by horizontal rotation of the arm 19. Further, by extension of the cylinders 23 at the carrying-in position P1, the gripped green tire TA descends up to a descent position hL, and it is then transferred to the lower mold 3. In case of this embodiment, at this time, in the lower mold 3 the lower bead ring 3b moves upward together with the center mechanism 16 to receive once the green tire TA located in the descent position hL, as shown in FIG. 7. Therefore, in this embodiment, the lower bead ring 3b constitutes a receiver 25 for receiving the green tire TA. After the receipt, the green tire TA descends together with the lower bead ring 3b and is placed on the lower mold 3 with position adjustment. By once seating the green tire TA on the bead ring 3b in this manner, the load of the green tire TA concentrically acts on the bead ring 3b, so off-center arrangement or bad fit between the green tire TA and the bead ring 3b can be suppressed.

A pressure cooling device 7 is disposed at the pressure cooling position P3, as shown in FIG. 1. It is a device for performing pressure cooling of a vulcanized tire TB with holding it. In this embodiment, the pressure cooling device 7 is rotatably attached to the upper frame 5B so that it can intermittently rotate about a horizontal axis 27 between the top and bottom positions, in other words, it can be turned upside down. Specifically, a pair of spindles 28, 28 extending vertically through a rotor 29 which is intermittently rotatable 180° are mounted on the horizontal axis 27 provided on the upper frame 5B in a protruding condition. Each spindle 28 is provided with an upper rim 30 for fixing the upper side bead of the vulcanized tire TB, and a lower rim 31 for fixing the lower side bead. Pressure cooling can be made by filling high-pressure air into the vulcanized tire TB held by the upper and lower rims between them. Further, the lower rim 31 to be disposed on the tip side of the spindle 28 is detachably mounted on the spindle 28, whereby it is possible to perform attachment and detachment of the vulcanized tire TB.

The tire receiving and mounting device 8 is attached to the traveling carriage 6, as shown in FIG. 4. The device 8 receives a vulcanized tire TB held by the upper mold 2 at the vulcanizing position P2, and it further conveys it to the pressure cooling position P3 and fits in the pressure cooling device 7.

Figure 8:
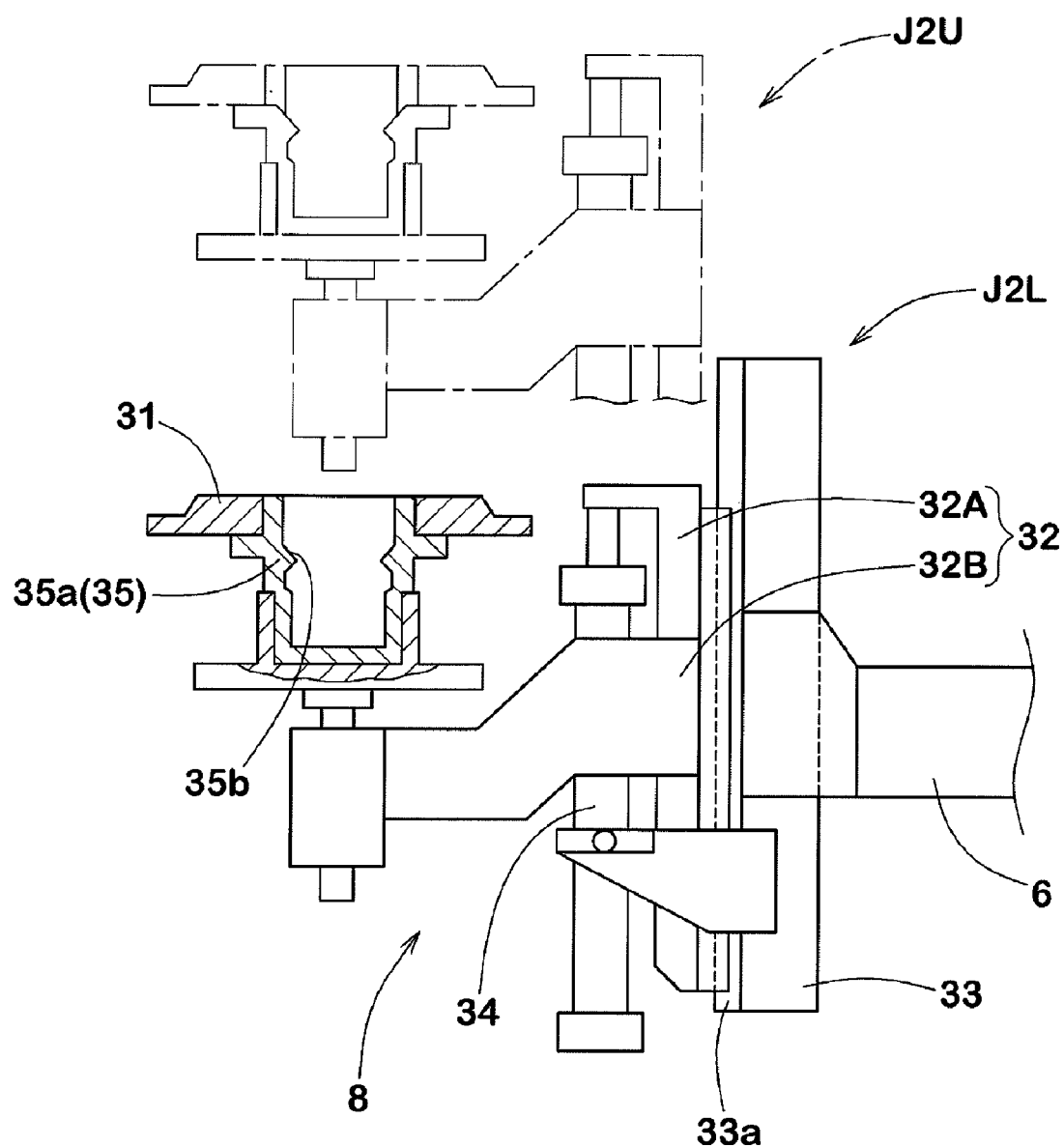
FIG. 8 is a front view illustrating a tire receiving and mounting device.

Specifically, as shown in FIG. 8, the tire receiving and mounting device 8 comprises an elevating base 32 which is attached to the traveling carriage 6 and can move up and down, and a lower rim 31 supported detachably by the elevating base 32. The elevating base 32 includes an elevating base body 32A which is guided to move up and down on a guide board 33 fixed to the traveling carriage 6 through a linear bearing 33a, and a supporting arm 32B extending forward from the elevating base body 32A. The elevating base body 32A is connected to the top end of a rod of a cylinder 34 supported by the guide board 33 and moves up and down by extension of the rod. The lower rim 31 is detachably supported at the tip of the supporting arm 32B through a rim support 35.

The rim support 35 has a cylindrical trunk portion 35a fixed integrally and concentrically to the lower rim 31. The trunk portion 35a is provided, on its inner surface, with for example a projecting locking part 35b by which the spindle 28 of the pressure cooling device 7 can be detachably locked. Since such a rim support 35 forms an integrated body with the lower rim 31, it is advantageous for accurately and stably holding a thin lower rim 31, and handling of the lower rim 31 such as attachment and detachment of the lower rim 31 to the pressure cooling device 7 can also be easily conducted.

When the lower mold 3 is located at the carrying-in position P1 and a green tire TA is transferred from the green tire transfer device 9 to the lower mold 3 as shown in FIG. 4, the lower rim 31 of the tire receiving and mounting device 8 is located at the vulcanizing position P2. At the vulcanizing position P2, the lower rim 31 receives a vulcanized tire TB from the upper mold 2.

Figure 9:
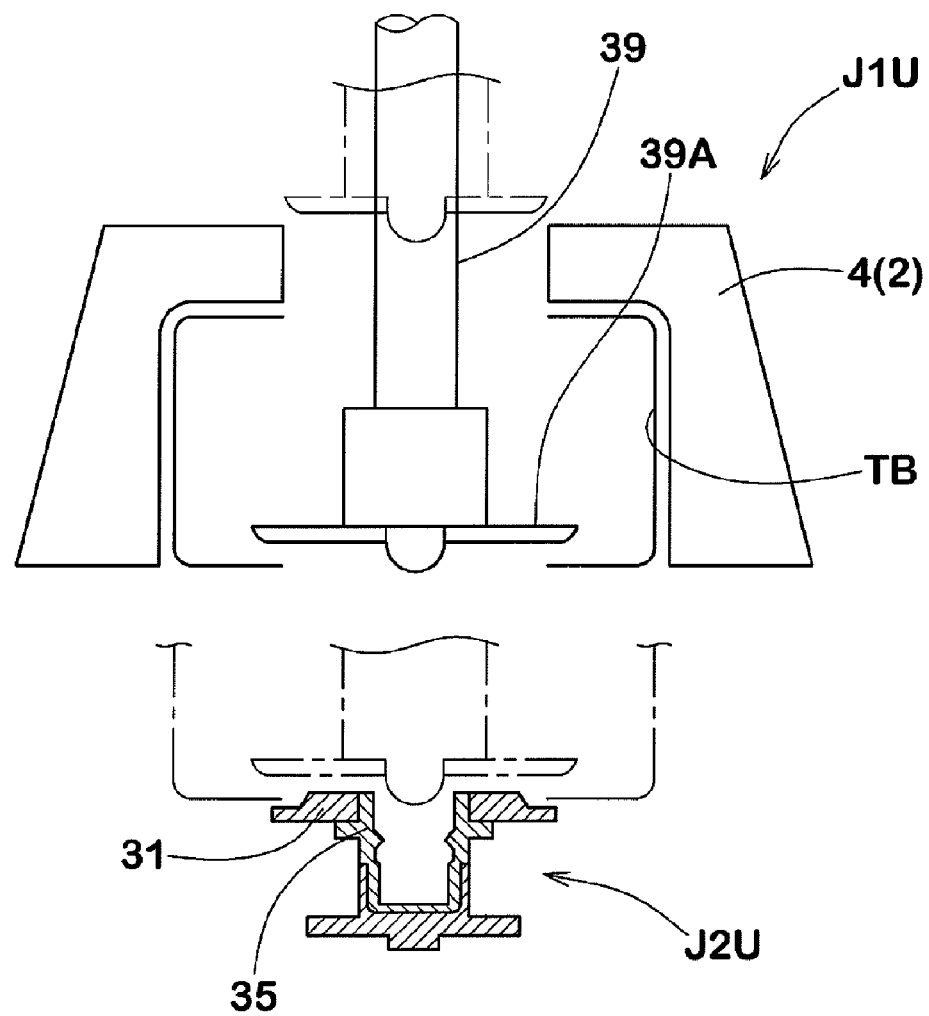
FIG. 9 is a schematic view illustrating transfer of a vulcanized tire from an upper mold to the tire receiving and mounting device.

The receipt of the vulcanized tire TB is made by downward movement of a center shaft 39 (shown in FIG. 9) installed in the upper mold 2. Specifically, when vulcanization by the vulcanization mold 4 is completed, the upper mold 2 moves upward to the elevated position J1U to put the vulcanization mold 4 into an open state. At that time, the vulcanized tire TB has been lifted together with the upper mold 2. Thereafter, the traveling carriage 6 operates so that, as shown in FIG. 4, the lower rim 31 of the tire receiving and mounting device 8 moves to the vulcanizing position P2. In that state, the cylinder 34 of the tire receiving and mounting device 8 operates so as to elevate the lower rim 31 from a descent position J2L to an ascent position J2U (shown in FIG. 9). Thereafter, as shown in FIG. 9, the center shaft 39 descends to separate the vulcanized tire TB from the upper mold 2. The separated tire is received by the lower rim 31 located at the ascent position J2U and waiting below the upper mold 2. The center shaft 39 has, at its lower end, a paddle 39A the diameter of which is extensible and contractible, and it can pass through an upper bead hole of the vulcanized tire TB when the paddle has contracted. Also, at the time of extension, the paddle 39A can push a lower side bead down to separate the vulcanized tire TB and can press the lower side bead to the lower rim 31, whereby the vulcanized tire TB can be accurately seated on the lower rim 31 without causing off-center arrangement or poor fit.

The green tire transfer device 9 lifts the received vulcanized tire TB up to the ascent position J2U at the pressure cooling position P3, whereby the vulcanized tire TB can be mounted on the spindle 28 of the pressure cooling device 7 together with the lower rim 31 and the rim support 35.

In this embodiment, a carrying-out device 39 for receiving and carrying out the vulcanized tire TB which has been pressure-cooled, is installed below the pressure cooling device 7, as shown in FIGS. 1 and 2. The carrying-out device 39 in this embodiment comprises a roller conveyer which is pivotally supported at a pivot point Q2 on the anterior end side and is tiltable from a horizontal waiting state Y1 to a forward tilting state Y2 (shown in FIG. 12(B)) that the posterior end side moves upward. The roller conveyer is provided at its center portion with a cut-away portion 39A (shown in FIG. 2) through which the lower rim 31 can pass upward and downward.

In this carrying-out device 39, when it is in the waiting state Y1, the conveying surface is positioned on a lower level than the lower rim 31 lying the descent position J2L of the tire receiving and mounting device 8, and when it is in the forward tilting state Y2, the conveying surface is positioned on a higher level than the lower rim 31. Therefore, the tire receiving and mounting device 8 can lift down the pressure-cooled vulcanized tire TB to the descent position J2L after receiving it from the pressure cooling device 7 together with the lower rim 31 and the rim support 35. Thereafter, when the carrying-out device 39 is tilted to the forward tilting state Y2, the vulcanized tire TB on the lower rim 31 held by the tire receiving and mounting device 8 is lifted up by the tilting conveying surface. Thus, only the vulcanized tire TB can be carried out along inclination of the conveying surface. That is to say, after the completion of the pressure cooling, only the vulcanized tire TB can be taken out, while recovering the lower rim 31 and the rim support 35 to the tire receiving and mounting device 8.

Figure 10A:
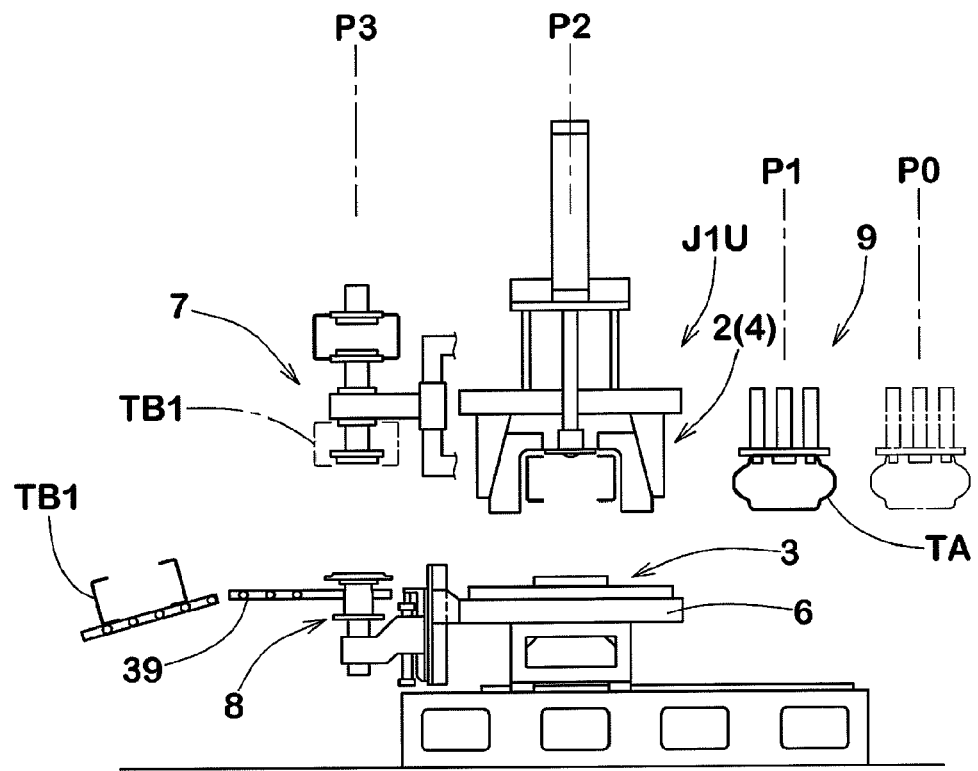
FIGS. 10(A) and 10(B) are schematic views illustrating operation of the tire vulcanizing apparatus.

The operation of the tire vulcanizing apparatus 1 will be explained with reference to FIGS. 10 and 11. FIG. 10(A) shows a state that the upper mold 2 has ascended up to the ascent position J1U after the completion of the vulcanization by the vulcanization mold 4. At that time, the tire receiving and mounting device 8 is located at the pressure cooling position P3, and the pressure-cooled vulcanized tire TB1 is removed thereby from the pressure cooling device 7 and carried out by the carrying-out device 39. Also, in the green tire transfer device 9, a green tire TA is carried in from the original position P0 to the carrying-in position P1.

Figure 10B:
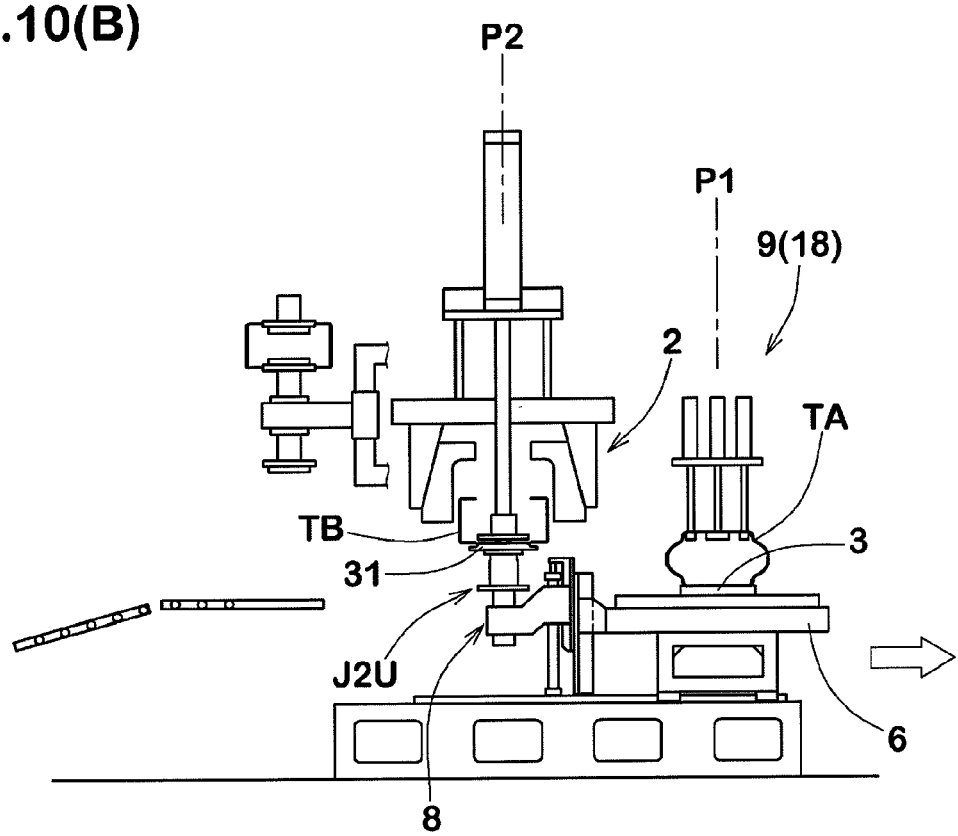

Thereafter, as shown in FIG. 10(B), the traveling carriage 6 is moved backward, so the lower mold 3 and the tire receiving and mounting device 8 stop at the carrying-in position P1 and the vulcanizing position P2, respectively. Then, at the carrying-in position P1, the grip assembly 18 descends and transfers the gripped green tire TA to the underlying lower mold 3. Also, at the vulcanizing position P2, the lower rim 31 of the tire receiving and mounting device 8 ascends up to the ascent position J2U and receives a vulcanized tire TB held by the upper mold 2.

Figure 11A:
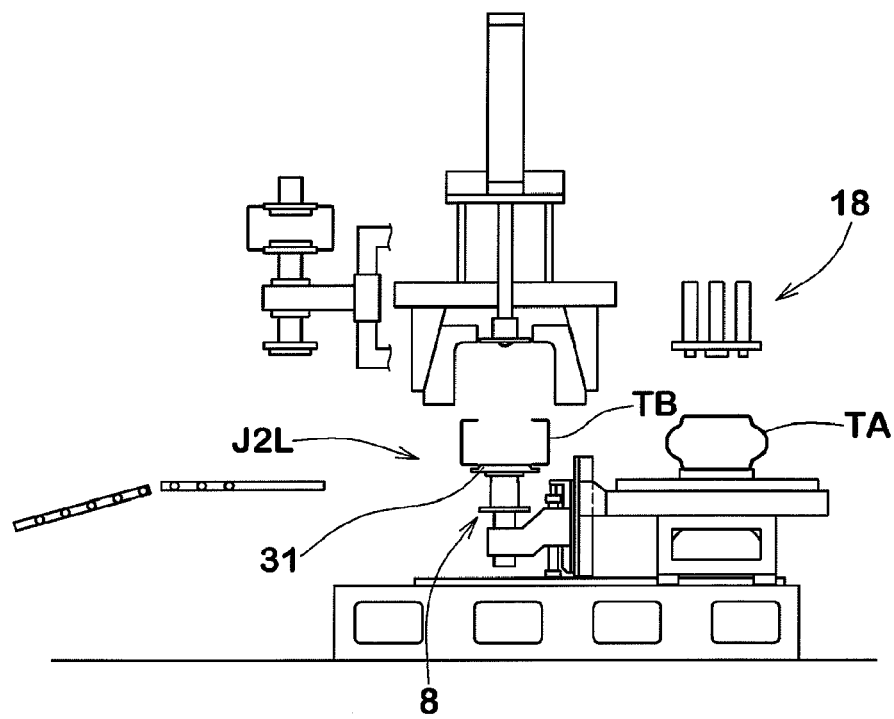
FIGS. 11(A) and 11(B) are schematic views further illustrating operation of the tire vulcanizing apparatus.
Figure 11B:
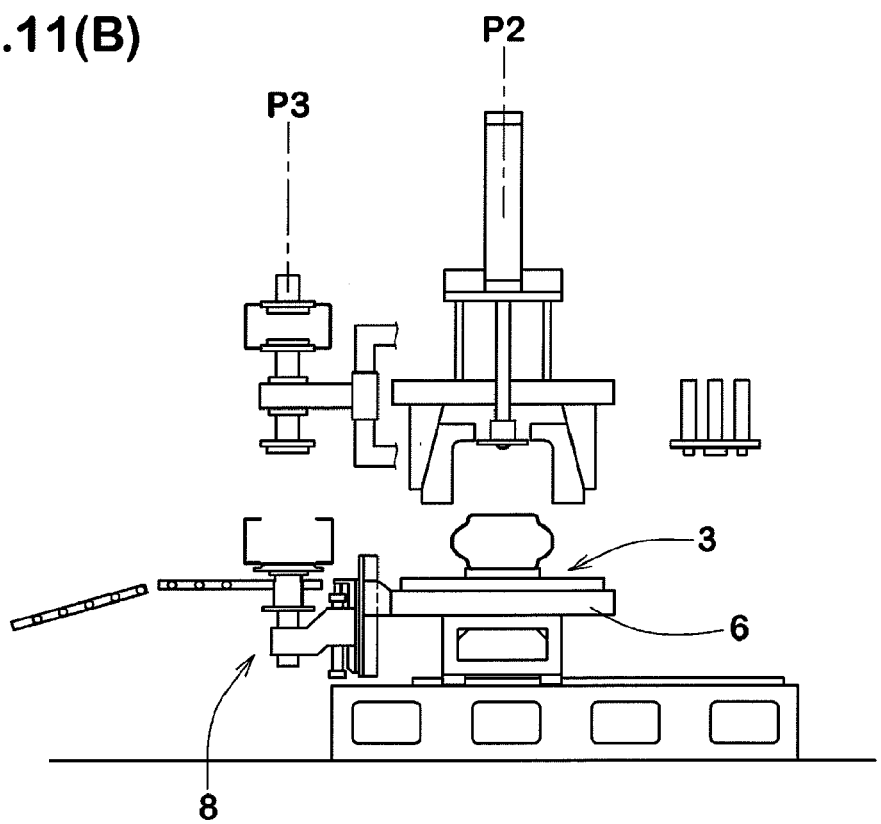

FIG. 11(A) shows a state that after the completion of the transfer of the green tire TA and the vulcanized tire TB, the grip assembly 18 ascends to the waiting position, and the lower rim 31 of the tire receiving and mounting device 8 descends to the descent position J2L. Thereafter, as shown in FIG. 11(B), the traveling carriage is moved forward, so the lower mold 3 and the tire receiving and mounting device 8 stop at the vulcanizing position P2 and the pressure cooling position P3, respectively.

Figure 12A:
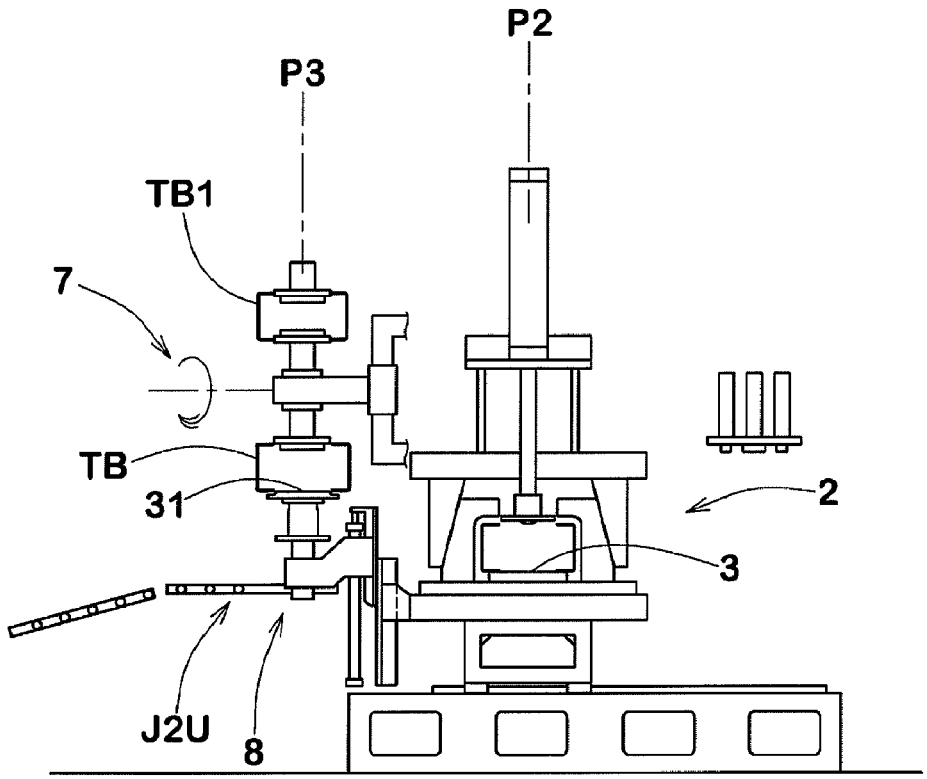
FIGS. 12(A) and 12(B) are schematic views further illustrating operation of the tire vulcanizing apparatus.
Figure 12B:
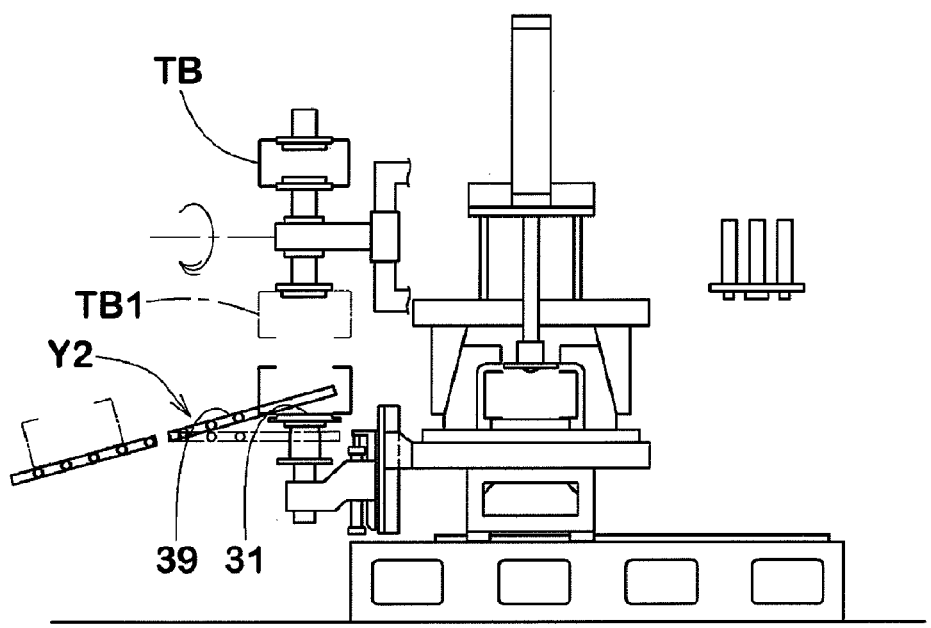

Then, at the vulcanizing position P2, the upper mold 2 descends and the green tire TA is vulcanized between the upper mold 2 and the lower mold 3, as shown in FIG. 12(A). Also, at the pressure cooling position P3, the lower rim 31 of the tire receiving and mounting device 8 ascends up to the ascent position J2U, and the vulcanized tire TB received from the upper mold 2 is mounted on the pressure cooling device 7 together with the lower rim 31. After the completion of mounting, the pressure cooling device 7 is turned over in the state that the tire receiving and mounting device 8 has descended, whereby the positions of the pressure-cooled vulcanized tire TB1 and the non-cooled vulcanized tire TB are counterchanged up and down. Thereafter, as shown in FIG. 12(B), the tire receiving and mounting device 8 ascends and descends again to receive the pressure-cooled vulcanized tire TB1 together with the lower rim 31, and only the pressure-cooled vulcanized tire TB1 is carried out by tilting the carrying-out device 39.

Like this, since in the tire vulcanizing apparatus 1 of the present invention, a lower mold 3 and a tire receiving and mounting device 8 are mounted on a traveling carriage 6, movement of the lower mold 3 between the carrying-in position P1 and the vulcanizing position P2 and movement of the device 8 between the vulcanizing position P2 and the pressure cooling position P3 can be achieved with high accuracy, respectively, by only reciprocating movement of the traveling carriage 6 between two positions. Furthermore, an upper mold 2, a pressure cooling device 7 and a green tire transfer device 9 are mounted on a frame 5 supporting the traveling carriage 6. Further, while a green tire is directly received on the lower mold 3 at the carrying-in position P1, in the tire receiving and mounting device 8 a vulcanized tire TB is directly received on a lower rim 31 at the vulcanizing position P2, and the vulcanized tire TB is mounted on the pressure cooling device 7 together with the lower rim 31 at the pressure cooling position P3.

Therefore, off-center arrangement, poor fit or the like which may occur at the time of transferring a tire at each of the positions P1 to P3, can be considerably suppressed, so carrying-in of green tires, vulcanization and pressure cooling can be continuously and efficiently performed and the quality and uniformity of vulcanized tires can be improved. Further, since the transfer pathway of tire can be simplified and shortened, apparatus and equipment can be downsized to achieve reduction of the installation space.

Although a particularly preferable embodiment of the present invention has been described, the present invention can be practiced with modifications into various embodiments without being limited to the embodiment shown in the drawings.

What is claimed is:

1. A tire vulcanizing apparatus wherein a green tire carried-in is vulcanized using a vulcanization mold composed of upper and lower molds and the vulcanized tire is taken out after pressure cooling, the apparatus having a carrying-in position into which a green tire is conveyed from an original position, to a vulcanizing position at which the green tire is vulcanized, and to a pressure cooling position at which the vulcanized tire is pressure-cooled, and the apparatus comprising a frame having rails;

a traveling carriage capable of reciprocating on the rails from the carrying-in position side toward the pressure cooling position side;

a vulcanization mold having an upper mold capable of moving up and down at the vulcanizing position, and a lower mold which is mounted on the traveling carriage and moves between the vulcanizing position and the carrying-in position;

a pressure cooling device disposed at the pressure cooling position and performing pressure cooling of the vulcanized tire;

a tire receiving and mounting device which is attached to the traveling carriage, and which receives at the vulcanizing position the vulcanized tire held by the upper mold, conveys it to the pressure cooling position and mounts it on the pressure cooling device; and a green tire transfer device having a grip assembly capable of gripping a green tire which has been conveyed to the original position and capable of moving up and down, the grip assembly being attached to the frame through an arm rotatable in a horizontal plane between the original position and the carrying-in position, and the grip assembly moving from the original position to the carrying-in position by horizontal rotation of the arm, descending at the carrying-in position and transferring the green tire to the lower mold, wherein the traveling carriage, the vulcanization mold, the pressure cooling device, the tire receiving and mounting device and the green tire transfer device are mounted on the frame.

2. The apparatus of claim 1, wherein the lower mold is equipped with a receiver which moves upward at the time of the transferring of the green tire, and which moves downward, after the receipt, and places the green tire on the lower mold with position adjustment.

3. The apparatus of claim 1, wherein the tire receiving and mounting device includes a lower rim for fixing a lower side bead of the vulcanized tire, the lower rim receives the vulcanized tire held by the upper mold at the vulcanizing position, and the received vulcanized tire is then mounted on the pressure cooling device together with the lower rim at the pressure cooling position.

4. The apparatus of claim 1, wherein the pressure cooling device is supported by the frame so as to be intermittently rotatable about a horizontal axis between top and bottom positions, and the frame is equipped below the pressure cooling device with a carrying-out device for receiving and carrying out the pressure-cooled tire.

5. The apparatus of claim 2, wherein the tire receiving and mounting device includes a lower rim for fixing a lower side bead of the vulcanized tire, the lower rim receives the vulcanized tire held by the upper mold at the vulcanizing position, and the received vulcanized tire is then mounted on the pressure cooling device together with the lower rim at the pressure cooling position.

6. The apparatus of claim 2, wherein the pressure cooling device is supported by the frame so as to be intermittently rotatable about a horizontal axis between top and bottom positions, and the frame is equipped below the pressure cooling device with a carrying-out device for receiving and carrying out the pressure-cooled tire.

7. The apparatus of claim 3, wherein the pressure cooling device is supported by the frame so as to be intermittently rotatable about a horizontal axis between top and bottom positions, and the frame is equipped below the pressure cooling device with a carrying-out device for receiving and carrying out the pressure-cooled tire.

8. The apparatus of claim 1, wherein the grip assembly includes a plurality of cylinders and gripping pieces which are attached to lower ends of rods of the cylinders and which can hold an upper side bead of the green tire in cooperation with each other and can descend by extension of the cylinder to transfer the green tire to the lower mold.

9. The apparatus of claim 1, wherein the lower mold includes a receiver for receiving the green tire which moves upward upon the transferring of the green tire, descends after receiving the green tire and places the green tire onto the lower mold with position adjustment, and the grip assembly includes a plurality of cylinders and gripping pieces which are attached to lower ends of rods of the cylinders and which can hold an upper side bead of the green tire in cooperation with each other and can descend by extension of the cylinder to transfer the green tire to the receiver which has moved upward.

* * * * *